United States Patent
Gu et al.

(10) Patent No.: US 9,941,958 B2
(45) Date of Patent: Apr. 10, 2018

(54) ON-CHIP TEST INTERFACE FOR VOLTAGE-MODE MACH-ZEHNDER MODULATOR DRIVER

(71) Applicant: Futurewei Technologies, Inc., Plano, TX (US)

(72) Inventors: Liang Gu, San Jose, CA (US); Yuming Cao, Pleasanton, CA (US); Yifan Gu, Santa Clara, CA (US); Hungyi Lee, Cupertino, CA (US); Gong Lei, Sunnyvale, CA (US); Yen Dang, San Jose, CA (US); Mamatha Deshpande, San Jose, CA (US); Shou-Po Shih, Cupertino, CA (US); Yan Duan, Ames, IA (US)

(73) Assignee: Futurewei Technologies, Inc., Plano, TX (US)

( * ) Notice: Subject to any disclaimer, the term of this patent is extended or adjusted under 35 U.S.C. 154(b) by 168 days.

(21) Appl. No.: 14/969,613

(22) Filed: Dec. 15, 2015

(65) Prior Publication Data
US 2017/0170894 A1  Jun. 15, 2017

(51) Int. Cl.
*H04B 10/516* (2013.01)
*H04B 10/564* (2013.01)
(Continued)

(52) U.S. Cl.
CPC ....... *H04B 10/0775* (2013.01); *H04B 10/516* (2013.01); *H04B 10/564* (2013.01); *H04B 10/588* (2013.01); *H04L 27/01* (2013.01)

(58) Field of Classification Search
CPC ... H04B 10/516; H04B 10/564; H04B 10/588
See application file for complete search history.

(56) References Cited

U.S. PATENT DOCUMENTS 6,429,700 B1 *  8/2002  Yang ................... H03F 3/45511
                                                  327/108
8,948,608 B1   2/2015  Pobanz
(Continued)

FOREIGN PATENT DOCUMENTS

| CN | 1450382 A | 10/2003 |
| CN | 101097281 A | 1/2008 |
| CN | 101834669 A | 9/2010 |

OTHER PUBLICATIONS

D. M. Gill et al., "Demonstration of a High Extinction Ratio Monolithic CMOS Integrated Nanophotonic Transmitter and 16 Gb/s Optical Link," in IEEE Journal of Selected Topics in Quantum Electronics, vol. 21, No. 4, pp. 212-222, Jul.-Aug. 2015; doi: 10.1109/JSTQE.2014.2381468; URL: http://ieeexplore.ieee.org/stamp/stamp.jsp?tp=&arnumber=6990765&is.*
(Continued)

*Primary Examiner* — Nathan Curs
(74) *Attorney, Agent, or Firm* — Conley Rose, P.C.

(57) ABSTRACT

An apparatus comprising a semiconductor chip that comprises an optical modulator configured to modulate an optical signal based on a received driver signal, a voltage-mode (VM) driver coupled to the optical modulator and configured to produce a level-shifted driver signal to modulate the optical signal, and a two-stage test interface coupled to the optical modulator and configured to receive and test the level shifted driver signal. The two-stage test interface comprises a voltage equalization stage coupled to an output-terminated buffer stage, the VM driver comprises a two-stage VM Mach-Zehnder modulator (MZM) driver that comprises a pre-driver coupled to a VM level-shifter (VMLS). The apparatus further comprises a resistor coupled to an output of the buffer stage, wherein the resistor comprises an amount of resistance that matches a termination (Continued)

resistance of a test equipment. The termination resistance is about 50 ohm (Ω).

21 Claims, 4 Drawing Sheets

(51) Int. Cl.
*H04B 10/588* (2013.01)
*H04B 10/077* (2013.01)
*H04L 27/01* (2006.01)

(56) References Cited

U.S. PATENT DOCUMENTS

| | | | |
|---|---|---|---|
| 2007/0075776 A1* | 4/2007 | Garlapati | H03F 3/3061 330/259 |
| 2007/0237444 A1 | 10/2007 | Keil et al. | |
| 2014/0233963 A1* | 8/2014 | Le Taillandier De Gabory | H04B 10/516 398/183 |
| 2016/0054639 A1* | 2/2016 | Kono | G02F 1/2255 385/2 |
| 2016/0112016 A1* | 4/2016 | Lakshmikumar | H03F 3/08 330/260 |
| 2017/0170894 A1 | 6/2017 | Gu et al. | |
| 2017/0187464 A1* | 6/2017 | Yamanaka | H04B 10/564 |

OTHER PUBLICATIONS

Foreign Communication From a Counterpart Application, PCT Application No. PCT/CN2016/109930, English Translation of International Search Report dated Mar. 8, 2017, 4 pages.

Foreign Communication From a Counterpart Application, PCT Application No. PCT/CN2016/109930, English Translation of Written Opinion dated Mar. 8, 2017, 4 pages.

\* cited by examiner

US 9,941,958 B2

ON-CHIP TEST INTERFACE FOR VOLTAGE-MODE MACH-ZEHNDER MODULATOR DRIVER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In silicon-based photonics, a Mach-Zehnder modulator (MZM) modulates electrical data onto an optical signal based on the electrical data received from a driver. Advancements in three-dimensional (3D) integration technologies for silicon-based electronics have allowed the MZM and its driver to be implemented together in the same electrical component to reduce a length of connections between the MZM and its driver. When a voltage-mode (VM) driver is used to drive the MZM, evaluation of the VM driver is complicated by a mismatch with testing equipment. Accordingly, an efficient means of testing a voltage-mode driver is desirable.

SUMMARY

In one embodiment, the disclosure includes an apparatus comprising a semiconductor chip that comprises an optical modulator configured to modulate an optical signal based on a received driver signal, a VM driver coupled to the optical modulator and configured to produce a level-shifted driver signal to modulate the optical signal, and a two-stage test interface coupled to the optical modulator and configured to receive and test the level-shifted driver signal.

In some embodiments, the two-stage test interface comprises a voltage equalization stage coupled to an output-terminated buffer stage, wherein the VM driver comprises a two-stage VM MZM driver that comprises a pre-driver coupled to a VM level-shifter (VMLS). In some embodiments, the apparatus further comprises a resistor coupled to an output of the buffer stage, wherein the resistor comprises an amount of resistance that matches a termination resistance of a test equipment. In some embodiments, the termination resistance is about 50 ohm ($\Omega$). In some embodiments, a voltage equalization stage comprises a common mode alignment apparatus, and wherein the output-terminated buffer stage comprises a current mode buffer. In some embodiments, the apparatus further comprises a silicon substrate on which the optical modulator, the VM MZM driver, and the two-stage test interface are disposed, wherein the optical modulator comprises an MZM.

In another embodiment, the disclosure includes an apparatus comprising a substrate, an optical modulator driver disposed on the substrate, an optical modulator disposed on the substrate and coupled to the optical modulator driver by a first circuit wiring, and a test interface disposed on the substrate and coupled to the optical modulator by a second circuit wiring and comprising a common-mode alignment (CMA) unit, a buffer coupled to the CMA unit, and a first resistor coupled to the buffer.

In some embodiments, the optical modulator is an MZM, the optical modulator driver is a VM MZM driver, the VM MZM driver comprises at least one pre-driver coupled to at least one VMLS. In some embodiments, the CMA unit comprises a second resistor coupled to a third resistor, and wherein the buffer is a current-mode buffer. In some embodiments, the second resistor has a second resistance value determined according to a relationship to a third resistance value of the third resistor. In some embodiments, the CMA unit further comprises a fourth resistor coupled to a fifth resistor, and wherein the fourth resistor has a fourth resistance value determined according to a relationship to a fifth resistance value of the fifth resistor. In some embodiments, the first resistor comprises an about 50$\Omega$ resistance. In some embodiments, the first circuit wiring comprises metal traces directly coupled between the MZM and the VM MZM driver, and the second circuit wiring comprises metal traces directly coupled between the MZM and the test interface.

In yet another embodiment, the disclosure includes a method comprising coupling a test device to a modulator test interface of an integrated circuit that includes an integrated test driver and an optical modulator configured to modulate an optical signal carried by an optical transceiver, receiving, by the modulator test interface a plurality of input signals, wherein the input signals comprise a first input signal comprising a first voltage level and a second input signal comprising a second voltage level, equalizing the received first and second input signals to have a common voltage level, receiving and buffering the equalized first and second input signals and generating, by a buffer of the modulator test interface, a plurality of buffered signals based on the plurality of equalized signals, and terminating, by the modulator test interface, the plurality of buffered signals to form terminated output signals.

In some embodiments, the plurality of buffered signals are terminated by coupling each of the buffered signals to a ground potential value through an about 50$\Omega$ resistance. In some embodiments, the plurality of buffered signals are terminated by coupling each of the buffered signals to a ground potential through a selectable resistive element that provides a selectable resistance that can be matches to a termination impedance of the test device In some embodiments, the plurality of equalized signals are generated by a CMA unit that comprises a plurality of resistors configured to equalize different input voltage levels. In some embodiments, the common voltage level is based on a relationship between the plurality of resistors. In some embodiments, the buffer that performs the step of buffering the equalized first and second input signals to generate the buffered signals is a current-mode buffer implemented in the modulator test interface. In some embodiments, from the optical modulator is an MZM, and the plurality of input signals are received from the MZM.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

It should be understood at the outset that although an illustrative implementation of one or more embodiments are provided below, the disclosed systems and/or methods may be implemented using any number of common techniques that are currently known or with future techniques not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments that provide for testing driver signals. A test interface is implemented to test driver signals provided to an optical modulator by an optical modulator driver. The test interface provides a measurement of an eye-level diagram of the optical modulator driver. The measurement is used, for example, to provide an optical module with measurements for validating the optical modulator driver. The test interface enables test equipment, such as a bit error rate tester (BERT) for detecting signal quality or an oscilloscope for generating a visual representation of the driver signals, to couple to the optical modulator without substantially affect signal quality and or circuit performance.

Figure 1:
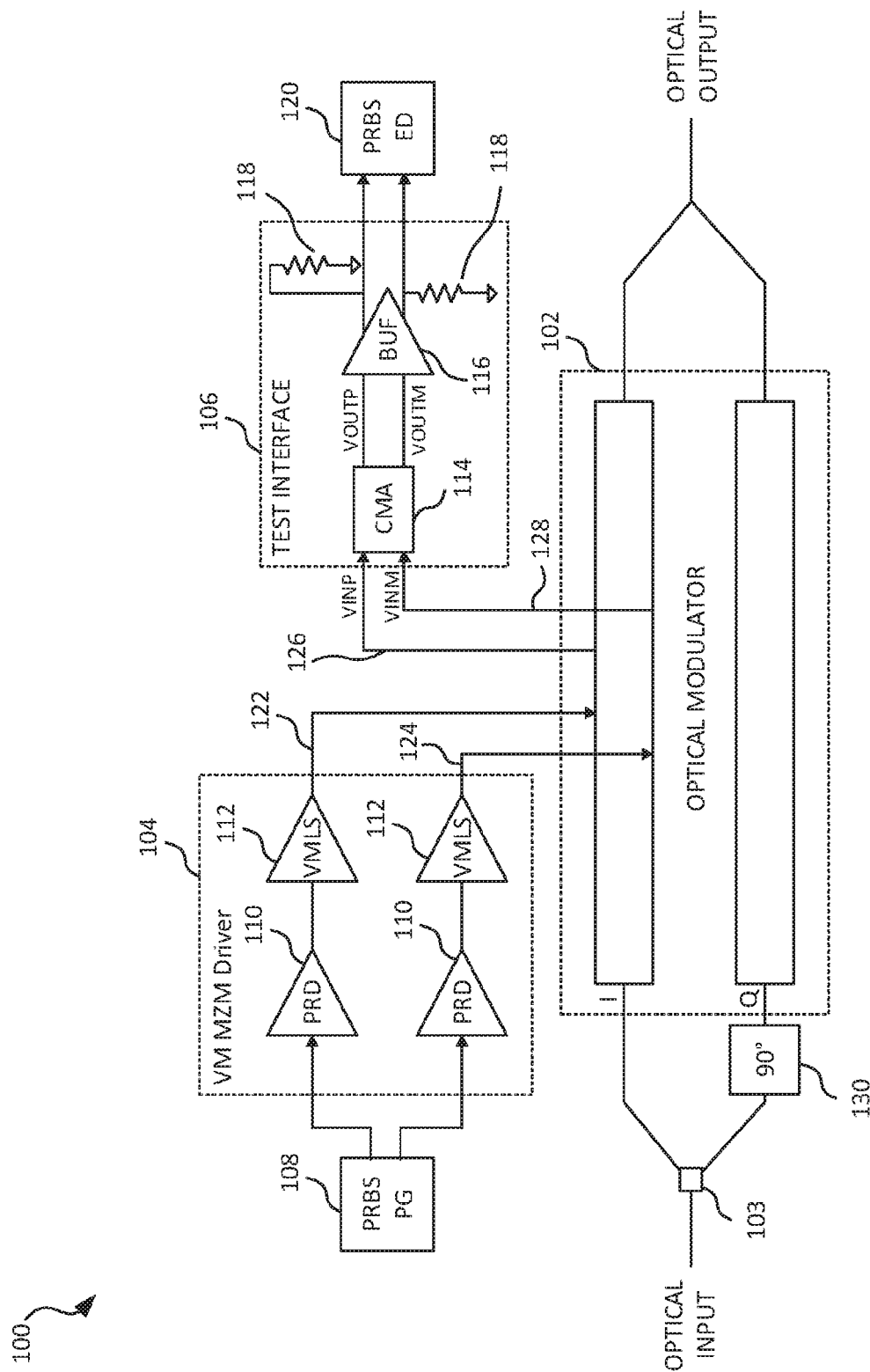
FIG. 1 is a schematic diagram of an embodiment of an MZM test architecture.

In one embodiment, as shown in FIG. 1, the optical modulator is a Mach Zehnder optical modulator (MZM) and the optical modulator driver is a VM MZM driver. When measuring or testing signals, the test equipment that is coupled to a circuit has a predefined termination impedance. If the circuit that is being tested does not have the same or a very similar termination impedance, reflection can occur between the test equipment and the circuit. Such reflection impairs the testing. The test interface, according to the various embodiments, provides a termination for the driver signals to match the termination impedance of the test equipment to enable the driver signals to be tested by the test equipment without substantially affecting signal quality or device performance. Further, the test equipment may cause capacitive or resistive loading of the driver signals that will degrade operation of the MZM. To alleviate the possibility of loading and other unwanted effects of connecting the test equipment, the test interface includes circuitry to create a buffer between the test equipment and the MZM such that each is isolated from the other.

In highly integrated electrical circuits, traces that connect electrical components to each other are small, leading to reduced power consumption by the electrical components and increased efficiency. To further increase efficiency, the test interface is implemented in the same electrical device as the MZM and the VM MZM driver. For example, the test interface is implemented in the same electrical component package, in the same electrical circuit component, the same semiconductor chip, on the same circuit board, on the same electrical chip, or on the same substrate, for example a silicon-based substrate, as the MZM and the VM MZM driver. Alternatively, the MZM comprises an optical component and the VM MZM driver and test interface comprise electrical components. The electrical components are stacked on top of the optical component according to 3D integration technology such that the optical component and the electrical component are implemented in the same 3D chip.

FIG. 1 is a schematic diagram of an embodiment of an MZM test architecture 100. The architecture 100 is suitable for implementation in a network element, such as a network element 500, described in FIG. 5 below, for processing an optical signal in an optical communications network. The architecture 100 includes an MZM 102, an VM MZM driver 104, and a test interface 106. Although the architecture 100 is illustrated as having the VM MZM driver 104 and the test interface 106 coupled to only one arm of the MZM 102 for simplicity, the test architecture 100 comprises a second VM MZM driver 104 and a second test interface 106 corresponding to the second arm of the MZM 102. Any portion of the following description that discusses or makes reference to the VM MZM driver 104 or test interface 106 and their relationship to each other and the MZM 102 is equally applicable to the second VM MZM driver 104 and the second test interface 106 and their couplings with the second arm of the MZM 102.

The MZM 102 receives an optical input signal and, according to an optical splitter 103, divides the signal into two components, an I component which may be referred to as the "in phase" component of the signal and a Q component which may be referred to as the "quadrature" component of the signal. Accordingly, the MZM 102 may be referred to as having two arms, an I component arm and a Q component arm. Both the I component of the signal and the Q component of the signal comprise a positive side and a negative side that are driven individually. The Q component of the signal has a phase that is shifted ninety degrees from the I component of the signal by an optical phase shifter 130. In one embodiment, the optical phase shifter 130 comprises a heater digital to analog converter (DAC).

The VM MZM driver 104 generates a voltage that is applied to the optical signal by MZM 102 to modulate the optical signal. More specifically, an electro-magnetic field (EMF) generated by the voltage introduces a phase shift into the optical signal to modulate the optical input signal. The data that is used to generate the voltage to modulate the optical input signal is transmitted to the VM MZM driver 104 is a pseudo random binary sequence (PRBS) generated by a pattern generator (PG) such as pattern generator 108. Pattern generator 108 typically generates a known data pattern to modulate the input optical signal for test purposes. Alternatively, the data for modulation is provided to the VM MZM driver 104 by a processor or other component (not shown) capable of generating and transmitting a data pattern to the VM MZM driver 104. The data pattern in the described embodiment is a pseudo random data pattern. Alternatively, the data pattern is a defined or known pattern.

The pre-drivers (PRD) 110 process the data received by the VM MZM driver 104 to generate a voltage. For example, the pre-drivers 110 may be digital logic inverters, amplifiers, or other components. Following the pre-drivers 110, VMLS 112 shifts an output voltage level of the pre-drivers 110 to a desired level. For example, the VMLS 112 shifts the output voltage level from a transistor-transistor logic (TTL) level to a complementary metal-oxide semiconductor (CMOS) level in one embodiment. Alternatively, the VMLS 112 shifts the output voltage level from the CMOS level to the TTL level or from any first level to a second level, for example from 1 volt (V) to 2V or from 0V to 1V. Notably, the VMLS 112 is voltage mode rather than current mode devices to facilitate driving the MZM 102 via the reduced traces discussed above. The VM MZM driver 104 is coupled to the MZM 102 such that a first VMLS 112 transmits an output signal to modulate a first side of the optical input signal and a second VMLS 112 transmits an output signal to modulate a second side of the optical input signal. For example, the first VMLS 112 transmits a positive output signal to the positive side of the top arm of MZM 102 carrying the I component of the optical input signal and the second VMLS 112 transmits a negative output signal to the negative side of the top arm of MZM 102 carrying the I component of the optical input signal. Alternatively, the outputs of the first VMLS 112 and the second VMLS 112 are reversed.

The test interface 106 enables terminated test equipment, for example PRBS error detection (ED) 120, to measure the output of the VM MZM driver 104 that drives the MZM 102. Traditionally, a current mode driver followed by a 50Ω terminated current mode buffer is used to drive the MZM 102 if the test equipment such as ED 120 has a 50Ω termination impedance.

In the described embodiment, the VM MZM driver 104 drives the MZM 102 with the unterminated VMLS 112. This causes an impedance mismatch between the terminated test equipment and the unterminated VMLS 112. The mismatch might cause reflections of voltage signals between the test equipment and the VM MZM driver 104 such that measurement of output of the VM MZM driver 104 by the test equipment is impaired. In a worst-case scenario, measurement of output of the VM MZM driver 104 by the test equipment is rendered impossible by the reflection. This problem is solved by terminating the output of the test interface 106 to match the termination impedance of the test equipment, for example, using an about 50Ω resistance.

The test interface 106 is directly coupled to the MZM 102 corresponding to the VM MZM driver 104 such that a first input of the test interface 106 receives a first input signal from a first side of the MZM 102 and a second input of the test interface 106 receives a second input signal from a second side of the MZM 102. For example, the test interface 106 may be coupled to the MZM 102 such that the first input of the test interface 106 receives a first input signal corresponding to an output signal of the first VMLS 112 and the second input of the test interface 106 receives a second input signal corresponding to an output signal of the second VMLS 112.

CMA unit 114 receives the first input signal and the second input signal of the test interface 106. The CMA unit 114 converts the first input signal and the second input signal of the test interface 106 to the same voltage level that is within a common-mode range of a buffer 116. The CMA unit 114 converts the first input signal and the second input signal using any suitable means for equalizing a plurality of voltages. In one embodiment, the CMA unit 114 comprises a plurality of resistors, for example, as shown in a CMA architecture 200 discussed below. The resistors are configured to receive a first voltage and, according to a ratio of a value of resistance of a first of the resistors to a value of resistance of a second of the resistors, output a second voltage that is less than the first voltage. After the CMA unit 114 equalizes the first input signal and the second input signal, this CMA unit 114 transmits the equalized as a first output signal and a second output signal, respectively, to the buffer 116.

The buffer 116 isolates a resistance or impedance of the CMA 114, VM MZM driver 104, and the MZM 102 from any test equipment coupled to the test interface 106. In one embodiment, the buffer 116 is a current-mode buffer, for example, a buffer 300 discussed below. The buffer 116 receives the first output signal and the second output signal of the CMA 114 and, based on the received signals, generates a first buffer output signal and a second buffer output signal. After the buffer 116 outputs the first buffer output signal and the second buffer output signal, an about 50Ω resistor 118 terminates each of the first buffer output signal and the second buffer output signal. Terminating the buffer output signals with about 50Ω resistors 118 to match the test equipment termination impedance creates a match between terminations of the buffer output signals and terminations of the test equipment, thereby reducing reflection of the output signals by the test equipment and test interface to a minimum level and enabling measurement of the output signals of the VM MZM driver 104 by the test equipment without interfering or affecting the input optical signals being conducted. In one embodiment, resistors 118 have selectable values to facilitate matching terminations with test equipment having different termination impedances.

As a result of advances in electrical component fabrication techniques, such as the 3D integration technology discussed above, a length of metallic traces, such as connections 122, 124, 126, and 128, among others, coupling a first portion of an electrical component to a second portion of the electrical component, for example, coupling the VM MZM driver 104 to the MZM 102 and the MZM 102 to the test interface 106, has decreased. Therefore, to reduce a trace length between the MZM 102 and the test interface 106, the test interface 106 is implemented in the same device, the same package, or the same printed circuit board as the MZM 102 and the VM MZM driver 104. For example, the MZM 102, the VM MZM driver 104, and the test interface 106 are implemented in a single electrical component or electrical chip, for example, on a same substrate on which the MZM 102 and the VM MZM driver 104 are located. The substrate is, for example, a silicon-based substrate on which metal layers are disposed to form electrical components and circuit wiring. Alternatively, the substrate may be a printed circuit board (PCB) in which metallic connections and circuit wiring are formed according to an etching process.

Figure 2:
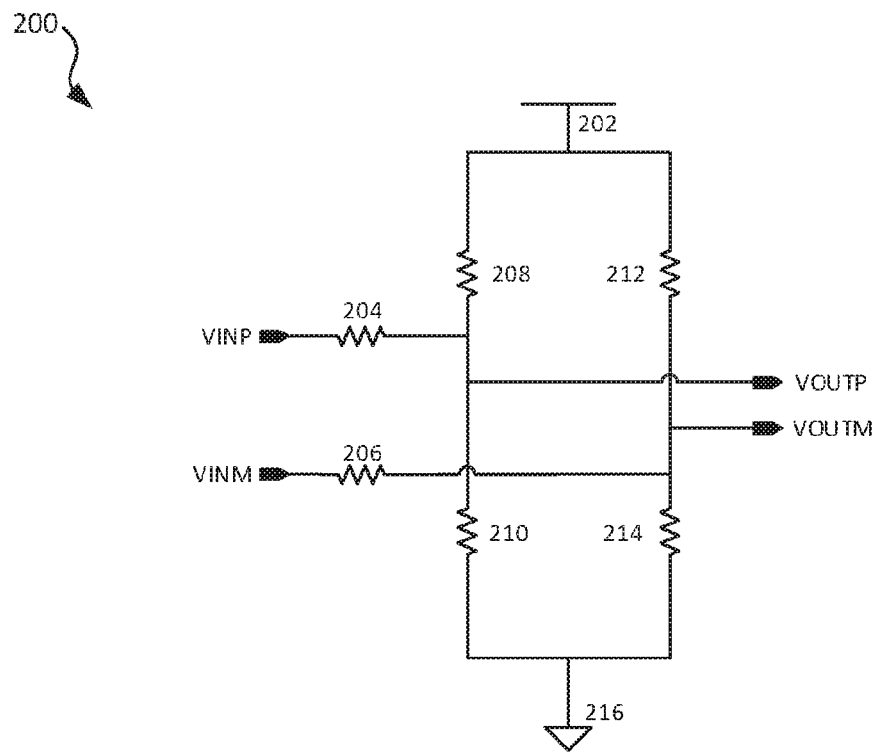
FIG. 2 is a schematic diagram of an embodiment of a common-mode alignment architecture.

FIG. 2 is a schematic diagram of an embodiment of the CMA architecture 200. The CMA architecture 200 is a passive electrical circuit that comprises a plurality of resistors 202, 204, 206, 208, 210, and 212 each having a specific resistance value; a connection to a voltage source 214; and a connection to a ground potential 216. The CMA architecture 200 receives a plurality of input signals each having a different voltage level and outputs a plurality of output signals each having a same voltage level. For example, the CMA architecture 200 receives from the MZM 102 a positive input signal (VINP) and a negative input signal (VINM) that are not equal and outputs a corresponding positive output signal (VOUTP) and negative output signal (VOUTM) that are based on the positive input signal and the negative input signal and are equal. The CMA architecture 200 determines the voltage level of its output signals according to the voltage levels of the input signals and a ratio of the resistance values of a first of the resistors 202-212 and at least a second of the resistors 202-212. To generate $V_{OUTP}$ and $V_{OUTM}$ as signals having an equal voltage magnitude, referred to as a common voltage or $V_{COM}$, the resistors 202-212 are determined according to:

$$V_{OUTP} = \frac{R_{P1}R_{P2}V_{INP} + R_{P2}R_{P3}V_{DD}}{R_{P1}R_{P2} + R_{P1}R_{P3} + R_{P2}R_{P3}} \quad (1)$$

$$V_{OUTM} = \frac{R_{M1}R_{M2}V_{INM} + R_{M2}R_{M3}V_{DD}}{R_{M1}R_{M2} + R_{M1}R_{M3} + R_{M2}R_{M3}}, \quad (2)$$

in which $V_{OUTP}$ is an output signal of the CMA architecture 200 based on the positive input signal $V_{INP}$, $R_{P1}$ is the resistance of the resistor 206, $R_{P2}$ is the resistance of the resister 208, $R_{P3}$ is the resistance of the resister 202, $V_{DD}$ is a value of a source voltage, $V_{VOUTM}$ is an output signal of the CMA architecture 200 based on the negative input signal $V_{INM}$, $R_{M1}$ is the resistance of the resister 210, $R_{M2}$ is the resistance of the resistor 212, and $R_{M3}$ is the resistance of the resistor 204. The resistors 202-212 may include or comprise resistors, variable resistors, resistor ladders, potentiometers, metallic traces on a printed circuit board, or any other suitable means for introducing a desired amount of resistance into an electrical circuit. In one embodiment, the resistive values are selectable to compensate for different ED 120 termination impedances.

Figure 3:
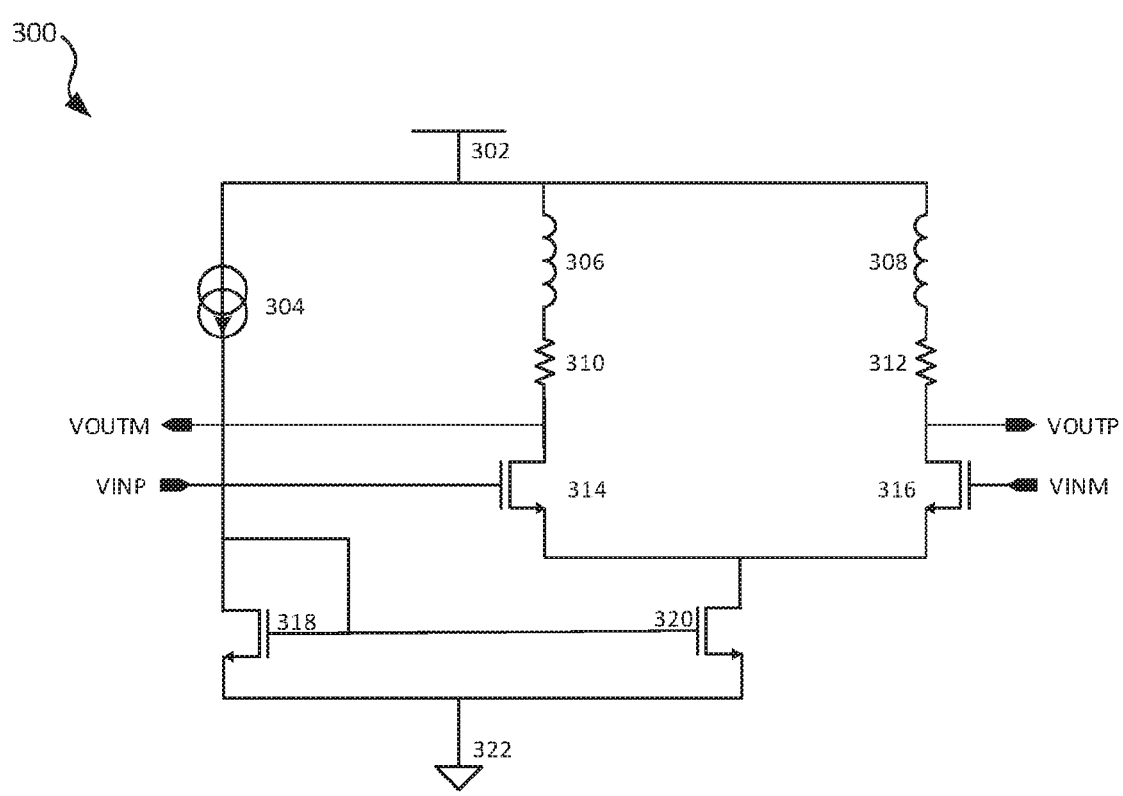
FIG. 3 is a schematic diagram of an embodiment of a buffer.

FIG. 3 is a schematic diagram of an embodiment of a buffer 300, which may be implemented in MZM test architecture 100 as the buffer 116. The buffer 300 receives a plurality of input signals and outputs a plurality of output signals based on the plurality of input signals. For example, the buffer 300 receives a positive input signal and a negative input signal from the CMA architecture 200 and outputs a positive output signal and a negative output signal that are based on the positive input signal and the negative input signal. Each output signal has a same value as the corresponding respective input signal, but may not be identical to its corresponding input signal.

The buffer 300 comprises a connection to a source voltage 302; a constant current source 304; a plurality of inductors 306 and 308; a plurality of resistors 310 and 312; a plurality of transistors 314, 316, 318, and 320; and a connection to a ground 322. The buffer 300 may experience degradation in performance and a reduction in operational bandwidth due to a capacitance, for example, a capacitive load placed on the buffer 300 or a parasitic capacitance that forms between components of the buffer 300. Parasitic capacitance is a generally unavoidable capacitance that forms between electrical components as a result of their proximity to each other and their internal construction and that generally increases at high frequencies. The inductors 306-308 compensate for the capacitance, for example, to reduce the capacitance and extend the operational bandwidth of the buffer 300. Specific inductance values for the inductors 306-308 are dependent upon a particular application for which the buffer 300 is intended, as well as a load of the buffer 300. In one embodiment of the buffer 300, the inductors 306-308 each have an inductance value in a range of about 100-200 picohenries (pH). The resistors 310-312 operate as a load for the buffer 300 and, in one embodiment, have a resistance value in the range of about 50-100Ω. The current source 304 provides a constant current in the buffer 300 and has a current value of less than or equal to about 200 microamps (uA).

The transistors 314-316 control switching in the buffer 300 and are each configured to respond to a particular input. Transistors 318-320 form a current mirror to cause transistor 320 to operate as a stable current source (sink) to bias transistors 314-316 into a desired operating range. As shown in FIG. 3, the transistors 314-320 are n-type metal-oxide-semiconductor (NMOS) transistors that are normally OFF unless an appropriate gate voltage is applied. A transistor may be understood as having a transistor gate, a transistor source, and a transistor drain.

A transistor configured to respond to a signal may be understood as having the signal coupled to the transistor's gate, and a transistor coupled between two components may be understood as having the transistor's source coupled to one of the components and the transistor's drain coupled to the other of the components. According to an input received on the transistor gate, the transistor source and transistor drain are coupled or uncoupled from each other by the transistor. Depending upon the transistor type, a signal presented at a gate terminal serves to create a field through the substrate material that either establishes or terminates a connection between the source and drain terminals. Stated differently, a device may be a normally ON or a normally OFF type device wherein a proper voltage presented at the gate serves to change the operational state of the device. In another embodiment, the buffer 300 employs p-type metal-oxide-semiconductor (PMOS) transistors while providing similar functionality. In yet another embodiment, the buffer 300 employs a combination of NMOS and PMOS transistors to provide similar functionality.

In the described embodiment, if normally OFF type devices are utilized, when one of the transistors 314-316 receives a logical "1" on its gate terminal (meaning a gate voltage of sufficient magnitude to turn on the device, for example, a voltage above a predetermined threshold with respect to the source voltage 302), the transistor is turned on and conducts current to ground to cause the voltage appearing at the source terminal to be equal to the difference between the supply voltage and a voltage drop across resistors 310 or 312, respectively. This voltage may represent a logic "0" output in one embodiment. When the transistor receives a logical "0" on its gate terminal (meaning a gate voltage of insufficient magnitude to turn on the device, for example, a voltage below a predetermined threshold with respect to the source voltage 302), the transistor is turned off and acts as an open circuit between its source terminal and drain terminal to cause the output voltage to equal or approach VDD which may be used to represent a logic "1" output.

The transistors 314-316 are configured to respond to the input signals received by the buffer 300 and cause the buffer 300 to generate the output signals based on the input signals by coupling the resistors 310-312 to the ground 322. For example, when the transistor 314 receives an input signal, for example the positive input signal (VINP), the transistor 314 turns on and acts as a short circuit that couples the resistor 310 to the ground 322, thereby creating a complete circuit in the buffer 300 and allowing the buffer 300 to generate the negative output signal (VOUTM) with a value of "0." Similarly, when the transistor 316 receives the negative input signal (VINM), the transistor 316 turns on and acts as a short circuit that couples the resistor 312 to the ground 322, thereby creating a complete circuit in the buffer 300 and allowing the buffer 300 to generate the positive output signal (VOUTP) with a value of logical "0." For both transistors 314 and 316, when the transistors 314-316 do not receive an input signal, the transistors 314-316 turn off such that an open circuit is created between the resistors 310-312 and the ground 322 and the output signals are generated with a value of "1." The transistors 318-320 are configured to be always on, coupling the constant current source 304 and the transistors 314-316 to the ground 322 to bias transistors 314-316.

Figure 4:
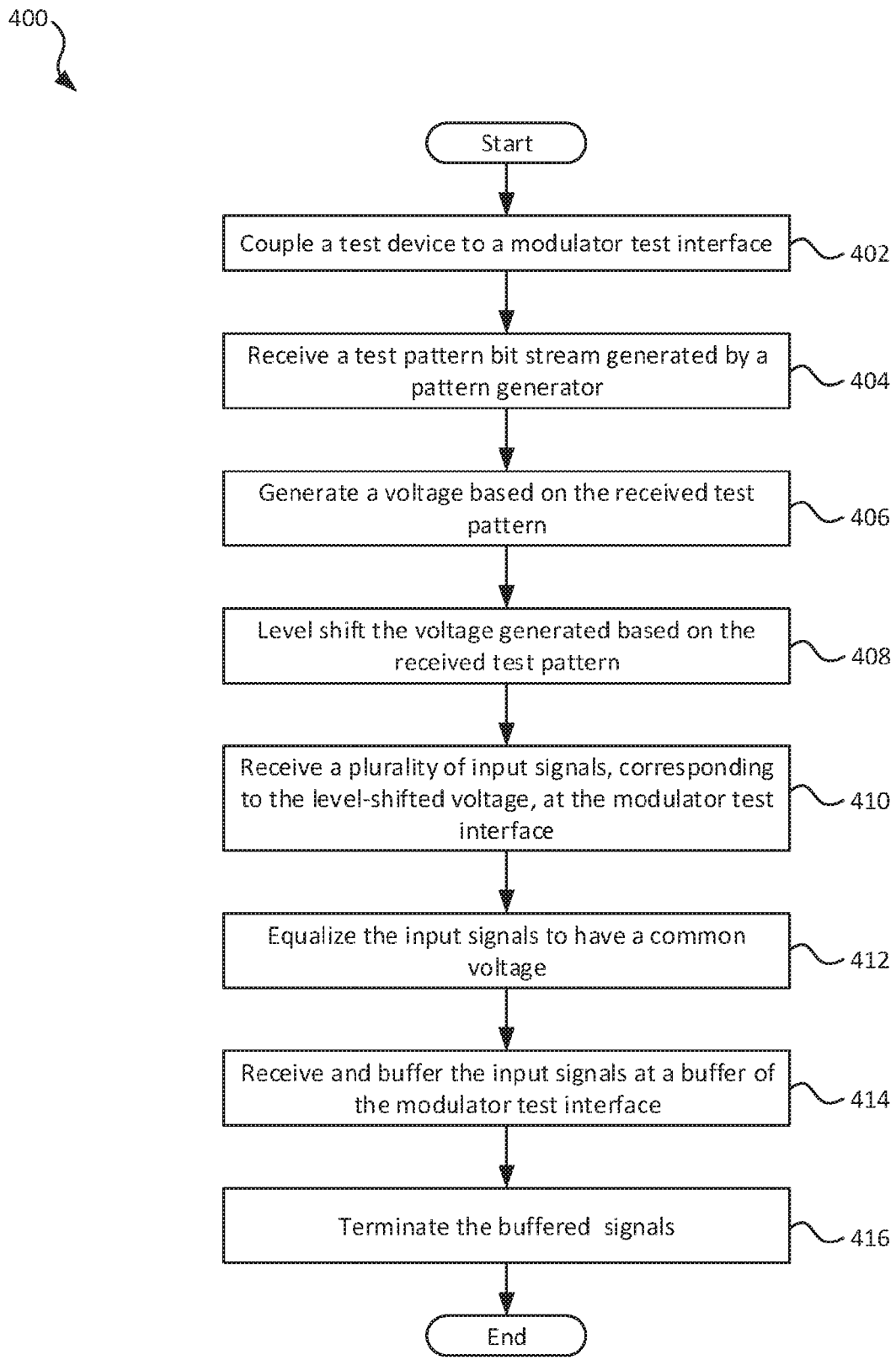
FIG. 4 is a flowchart of an embodiment of a test interface method.

FIG. 4 is a flowchart of an embodiment of a test interface method 400. The method is implemented in a modulator semiconductor chip of an optical transceiver in an optical communications network to enable testing of one or more modulator driver signals in the modulator semiconductor chip by terminated test equipment. For example, the modulator semiconductor chip may be a single semiconductor chip that includes a modulator, such as the MZM 102, a modulator driver, such as the VM MZM driver 104, and a modulator test interface, such as the test interface 106, on a single, shared substrate. At step 402, the method commences with coupling a test device to a modulator test interface of an integrated circuit that includes an integrated test driver and an optical modulator configured to modulate an optical signal carried by an optical transceiver.

In at least one embodiment, the optical modulator is a MZM. At a high level, the process includes generating the signals that modulate the optical signal and receiving and testing the signals that are generated to modulate the optical signals by a test interface circuit that produces an output based on the received signals to a test device or element. Accordingly, at step 404, the method includes receiving a test pattern bit stream generated by a pattern generator, processor, or other component capable of generating a data pattern. At step 406, the method continues with one or more drivers generating a voltage based on the received test pattern to modulate the optical signal. The method also includes, optionally, at step 408, level shifting the output of the at least one driver from a first level to a second level to correspond to a modulator input requirement.

While the test interface is disposed and formed within a common device or substrate as the VM MZM driver and modulator such as MZM 102, it often is disposed in a location that is not convenient to receive the driver signals that modulate the optical signal directly. Accordingly, the method may include extracting the driver signals from the optical modulator. In either case, the method continues at step 410 with receiving, by a modulator test interface, a plurality of input signals, wherein the input signals comprise a first input signal comprising a first voltage level and a second input signal comprising a second voltage level. These input signals correspond to the driver test signals generated by the VM MZM driver.

The plurality of input signals are received, for example, from the modulator, such as an MZM, according to the modulator driver. At step 412, the method includes equalizing the first and second input signals to have a common voltage level to produce a plurality of equalized first and second input signals as output signals. The common voltage level is based on a relationship between the plurality of resistors. The first and second input signals are equalized, in one embodiment, according to a voltage dividing process implemented in hardware such as a common-mode alignment unit, such as the CMA architecture 200, or a voltage-divider. The voltage dividing process is performed by processing the input signals using a plurality of resistors, where a first of the resistors has a first resistance value and a second of the resistors has a second resistance value such that a ratio between the first resistor and the second resistor determines the output signals. A specific desired voltage level of the plurality of output signals is achieved by adjusting resistance values of the plurality of resistors to, for example, equalize the plurality of output signals such that each of the plurality of output signals has the same or similar voltage level.

At step 414, the method includes receiving and buffering the equalized first and second input signals and generating, by a buffer of the modulator test interface, a plurality of buffered signals based on the equalized first and second input signals. The plurality of buffered signals are generated by, for example, generating a plurality of new signals that are isolated from effects of capacitive or resistive loading and are generated according to the plurality of equalized output signals. Generating the plurality of buffered signals buffers and isolates electrical components of the modulator semiconductor chip from any test equipment that may be coupled to the modulator semiconductor chip such that coupling the test equipment to the modulator semiconductor chip will provide viewing of at least one signal from the modulator semiconductor chip but not alter any signal of the modulator semiconductor chip. The buffered signals are generated, for example, by a current-mode buffer, such as buffer 300 of the modulator test interface, which generates the plurality of buffered signals according to the plurality of equalized output signals received by a corresponding plurality of transistors.

At step 416, the plurality of buffered signals are terminated by the modulator test interface, the plurality of buffered signals to form terminated output signals that are produced to the test device. The plurality of buffered signals are terminated by coupling a metal trace or connection on which each of the plurality of buffered signals is transmitted to ground via a specified amount of resistance. The resistance for each termination is provided by one or more transistors, resistor ladders, potentiometers, variable resistors, metal traces or deposits, or any other suitable means for adding resistance to an electronic circuit. Terminating the plurality of buffered signals enables test equipment terminated with a corresponding amount of resistance to receive and measure the plurality of terminated output signals with a minimum amount of reflection or loss of the plurality of terminated output signals.

The specific amount of resistance used to terminate the plurality of buffered signals is determined according to an amount of resistance with which a desired test equipment is terminated and is, in one embodiment, about 50Ω. In one embodiment, the plurality of buffered signals are terminated by coupling each of the buffered signals to a ground potential through selectable resistive element that provides a selectable resistance that can be matched to a termination impedance of the test equipment.

Figure 5:
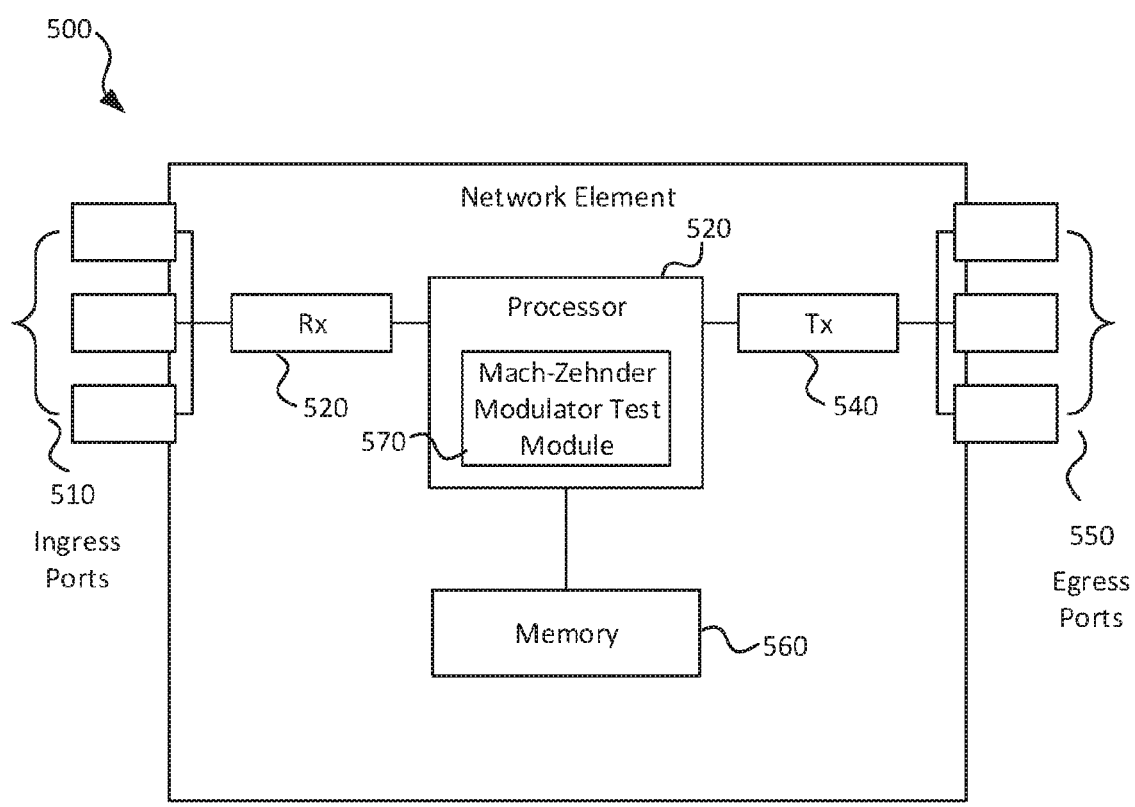
FIG. 5 is a schematic diagram of an embodiment of a network device.

FIG. 5 is a schematic diagram of a network device 500 according to an embodiment of the present disclosure. The network device 500 is suitable for implementing the architecture 100, CMA architecture 200, buffer 300, and method 400 of the present disclosure. The network device 500 comprises ingress ports 510 and receiver units (Rx) 520 for receiving data; a processor, logic unit, or central processing unit (CPU) 530 to process the data; transmitter units (Tx) 540 and egress ports 550 for transmitting the data; and a memory 560 for storing the data. The network device 500 may also comprise optical-to-electrical (OE) components and electrical-to-optical (EO) components coupled to the ingress ports 510, receiver units 520, transmitter units 540, and egress ports 550 for egress or ingress of optical or electrical signals.

The processor 530 may be implemented by hardware and software. The processor 530 may be implemented as one or more CPU chips, cores (e.g., as a multi-core processor), field-programmable gate arrays (FPGAs), application specific integrated circuits (ASICs), and digital signal processors (DSPs). The processor 530 is in communication with the ingress ports 510, receiver units 520, transmitter units 540, egress ports 550, and memory 560. The processor 530 comprises MZM test module 570. The MZM test module 570 performs modulation of an optical input signal according to a signal received from a driver and a test interface for testing the signal received from the driver, all implemented on a same semiconductor chip. The inclusion of the MZM test module 570 therefore provides an improvement to the functionality of the network device 500. The MZM test module 570 also effects a transformation of the network device 500 to a different state.

The memory 560 comprises one or more disks, tape drives, and solid-state drives and may be used as an overflow data storage device, to store programs when such programs are selected for execution, and to store instructions and data that are read during program execution. The memory 560 may be volatile and non-volatile and may be read-only memory (ROM), random-access memory (RAM), ternary content-addressable memory (TCAM), and static random-access memory (SRAM).

The use of the term "about" means a range including ±10% of the subsequent number, unless otherwise stated. For any component of the present disclosure, a first component is directly coupled to a second component when there are no intervening components, except a line, a trace, or other mediums, between the first component and the second component. A first component is indirectly coupled to a second component when there are intervening components between the first component and the second component. Coupling may mean either direct coupling or indirect coupling. While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a semiconductor chip comprising:
      an optical modulator configured to modulate an optical signal based on a received driver signal;
      a voltage-mode (VM) driver coupled to the optical modulator, comprising a two-stage VM Mach-Zehnder modulator (MZM) driver that comprises a pre-driver coupled to a VM level-shifter (VMLS), and configured to produce a level-shifted driver signal to modulate the optical signal; and
      a two-stage test interface coupled to the optical modulator, comprising a voltage equalization stage coupled to an output-terminated buffer stage, and configured to receive the level-shifted driver signal.

2. The apparatus of claim 1, further comprising a resistor coupled to an output of the output-terminated buffer stage, wherein the resistor comprises an amount of resistance that matches a termination resistance of a test equipment.

3. The apparatus of claim 2, wherein the termination resistance is about 50 ohms ($\Omega$).

4. The apparatus of claim 1, wherein the voltage equalization stage comprises a common mode alignment apparatus, and wherein the output-terminated buffer stage comprises a current mode buffer.

5. The apparatus of claim 1, further comprising a silicon substrate on which the optical modulator, the VM MZM driver, and the two-stage test interface are disposed, wherein the optical modulator comprises an MZM.

6. The apparatus of claim 1, wherein the two-stage test interface is further configured to facilitate testing of the level-shifted driver signal.

7. An apparatus comprising:
   a substrate;
   an optical modulator driver disposed on the substrate;
   an optical modulator disposed on the substrate and coupled to the optical modulator driver by a first circuit wiring; and
   a test interface disposed on the substrate, coupled to the optical modulator by a second circuit wiring, and comprising:
      a common-mode alignment (CMA) unit;
      a buffer coupled to the CMA unit; and
      a first resistor coupled to the buffer.

8. The apparatus of claim 7, wherein the optical modulator is a Mach-Zehnder modulator (MZM), wherein the optical modulator driver is a voltage-mode (VM) MZM driver, and wherein the VM MZM driver comprises at least one pre-driver coupled to at least one VM level-shifter (VMLS).

9. The apparatus of claim 7, wherein the CMA unit comprises a second resistor coupled to a third resistor, and wherein the buffer is a current-mode buffer.

10. The apparatus of claim 9, wherein the second resistor has a second resistance value determined according to a relationship to a third resistance value of the third resistor.

11. The apparatus of claim 9, wherein the CMA unit further comprises a fourth resistor coupled to a fifth resistor, and wherein the fourth resistor has a fourth resistance value determined according to a relationship to a fifth resistance value of the fifth resistor.

12. The apparatus of claim 7, wherein the first resistor comprises a resistance of about 50 ohms ($\omega$).

13. The apparatus of claim 8, wherein the first circuit wiring comprises metal traces directly coupling the MZM and the VM MZM driver, and wherein the second circuit wiring comprises metal traces directly coupling the MZM and the test interface.

14. A method comprising:
   coupling a test device to a modulator test interface of an integrated circuit that includes an integrated test driver and an optical modulator configured to modulate an optical signal carried by an optical transceiver;
   receiving, by the modulator test interface, a plurality of input signals, wherein the input signals comprise a first input signal comprising a first voltage level and a second input signal comprising a second voltage level;
   equalizing the first input signal and the second input signal to create an equalized first input signal and an equalized second input signal having a common voltage level;

receiving and buffering, by a buffer of the modulator test interface, the equalized first input signal and the equalized second input signal to generate a plurality of buffered signals based on the equalized first input signal and the equalized second input signal; and terminating, by the modulator test interface, the buffered signals to form terminated output signals that are produced to the test device.

15. The method of claim 14, wherein the buffered signals are terminated by coupling each of the buffered signals to a ground potential through a resistance of about 50 ohms (Ω).

16. The method of claim 14, wherein the buffered signals are terminated by coupling each of the buffered signals to a ground potential through a selectable resistive element that provides a selectable resistance.

17. The method of claim 14, wherein the equalized first input signal and the equalized second input signal are generated by a common-mode alignment (CMA) unit that comprises a plurality of resistors configured to equalize different input voltage levels.

18. The method of claim 17, wherein the common voltage level is based on a relationship between the resistors.

19. The method of claim 14, wherein the buffer is a current-mode buffer implemented in the modulator test interface.

20. The method of claim 14, wherein the optical modulator is a Mach-Zehnder modulator (MZM), and wherein the plurality of input signals are received from the MZM.

21. The method of claim 16, wherein the selectable resistance that can be matched to a termination impedance of the test device.

* * * * *